United States Patent
Kolassery et al.

(10) Patent No.: US 9,336,100 B2
(45) Date of Patent: May 10, 2016

(54) EFFICIENT DEBUGGING OF MEMORY MISCOMPARE FAILURES IN POST-SILICON VALIDATION

(71) Applicant: International Business Machines Corporation, Armonk, NY (US)

(72) Inventors: Vysakh Kolassery, Calicut (IN); Gunaranjan Kurucheti, Bangalore (IN); Subrat K. Panda, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/141,845

(22) Filed: Dec. 27, 2013

(65) Prior Publication Data

US 2015/0186227 A1    Jul. 2, 2015

(51) Int. Cl.
- G11C 29/00 (2006.01)
- G06F 11/16 (2006.01)
- G06F 11/36 (2006.01)
- G06F 11/07 (2006.01)

(52) U.S. Cl.
CPC ............ *G06F 11/167* (2013.01); *G06F 11/079* (2013.01); *G06F 11/0721* (2013.01); *G06F 11/0778* (2013.01); *G06F 11/3636* (2013.01)

(58) Field of Classification Search
CPC .................................................. G06F 11/167
See application file for complete search history.

(56) References Cited

U.S. PATENT DOCUMENTS

| | | | |
|---|---|---|---|
| 6,496,792 B1 * | 12/2002 | Magnusson | G06F 11/261 703/17 |
| 6,790,680 B1 | 9/2004 | Grover et al. | |
| 7,373,619 B2 | 5/2008 | Johnson | |
| 7,483,824 B1 | 1/2009 | Hill | |
| 7,895,029 B2 | 2/2011 | King et al. | |
| 8,069,325 B2 | 11/2011 | Vermeulen et al. | |
| 8,892,951 B2 | 11/2014 | Chandra et al. | |
| 2008/0163186 A1 | 7/2008 | Devarajan et al. | |
| 2011/0087861 A1 | 4/2011 | Bertacco et al. | |
| 2012/0084538 A1 | 4/2012 | Alapati et al. | |

(Continued)

FOREIGN PATENT DOCUMENTS

| | | |
|---|---|---|
| EP | 1870829 A1 | 12/2007 |
| WO | 2012087894 A2 | 6/2012 |

OTHER PUBLICATIONS

U.S. Appl. No. 14/141,981 Entitled "Architectural Failure Analysis" filed Dec. 27, 2013.

(Continued)

*Primary Examiner* — Sam Rizk
(74) *Attorney, Agent, or Firm* — Stephen Yoder; David B. Woycechowsky

(57) ABSTRACT

Debugging techniques performed post-silicon, but with reference to pre-silicon phase data and/or reference model data. For example, one debugging technique is as follows: (i) receiving a first memory location that is subject to a miscompare between an associated simulation value for the first memory location and an associated actual value for the first memory location; (ii) backtracking through instructions of a test case to determine the identity of a set of backtrack locations upon which the first memory location is dependent, with the set of backtrack locations being made up of at least one of: memory locations and register locations; and (iii) comparing respective simulation values and actual values for at least one of the backtrack locations to help determine a cause of the miscompare at the first memory location.

12 Claims, 6 Drawing Sheets

(56) References Cited

U.S. PATENT DOCUMENTS

| | | |
|---|---|---|
| 2012/0254827 A1 | 10/2012 | Conrad et al. |
| 2012/0324208 A1 | 12/2012 | Alapati et al. |
| 2013/0013246 A1 | 1/2013 | Adir et al. |
| 2014/0019806 A1 | 1/2014 | Kahne |
| 2014/0032969 A1 | 1/2014 | Landa et al. |
| 2014/0053134 A1 | 2/2014 | Wiggers et al. |

OTHER PUBLICATIONS

Bojan et al., "Functional Coverage Measurements and Results in Post-Silicon Validation of Core TM2 Duo Family", pp. 145-150, Copyright 2007 IEEE.

Chang et al., "Automating Post-Silicon Debugging and Repair", IEEE/ACM International Conference on Computer-Aided Design, Nov. 4-8, 2007, ICCAD 2007, © 2007 IEEE, pp. 91-98.

Lin et al., "Quick detection of difficult bugs for effective post-silicon validation", Design Automation Conference (DAC), 2012 49th ACM/EDAC/IEEE, Jun. 3-7, 2012, pp. 561-566.

Nahir et al., "Optimizing Test-Generation to the Execution Platform", 2012 17th Asia and South Pacific Design Automation Conference (ASP-DAC), Jan. 30, 2012-Feb. 2, 2012, pp. 304-309.

Park et al., "IFRA: Instruction Footprint Recording and Analysis for Post-Silicon Bug Localization in Processors", Technical Report (version 1.2)—last updated Dec. 10, 2008, pp. 1-14, DAC 2008.

Sadasivam et al., "Test Generation Approach for Post-Silicon Validation of High End Microprocessor", 2012 15th Euromicro Conference on Digital System Design, pp. 830-836, Copyright 2012 IEEE, © 2012 IEEE DOI 10.1109/DSD.2012.148.

Yang et al., "Automated Data Analysis Solutions to Silicon Debug", 978-3-9810801-5-5/DATE09 © 2009 EDAA.

Balston et al., "Emulation in Post-Silicon Validation: It's Not Just for Functionality Anymore", Published in 2012 IEEE International High Level Design Validation and Test Workshop (HLDVT), pp. 110-117, Copyright 2012 IEEE.

Balston et al., "Post-Silicon Code Coverage for Multiprocessor System-on-Chip Designs", IEEE Transactions on Computers, vol. 62, No. 2, Feb. 2013, pp. 242-246.

Friedler et al., "Post-Silicon Debugging of Transactional Memory Tests", IBM Research, Center for Informatics and Information Technologies, WTM'13, Prague, Apr. 14, 2013, pp. 1-10, Grace Period Disclosure.

Nahir et al., "Bridging Pre-Silicon Verification and Post-Silicon Validation", Copyright is held by the author/owner(s), DAC'10, Jun. 13-18, 2010, Anaheim, California, USA, pp. 94-95, ACM 978-1-4503-0002-5/10/06.

"Effective Post-Silicon Failure Localization Using Dynamic Slicing", DAC'13, Austin, TX, USA, Copyright 2013 ACM.

* cited by examiner

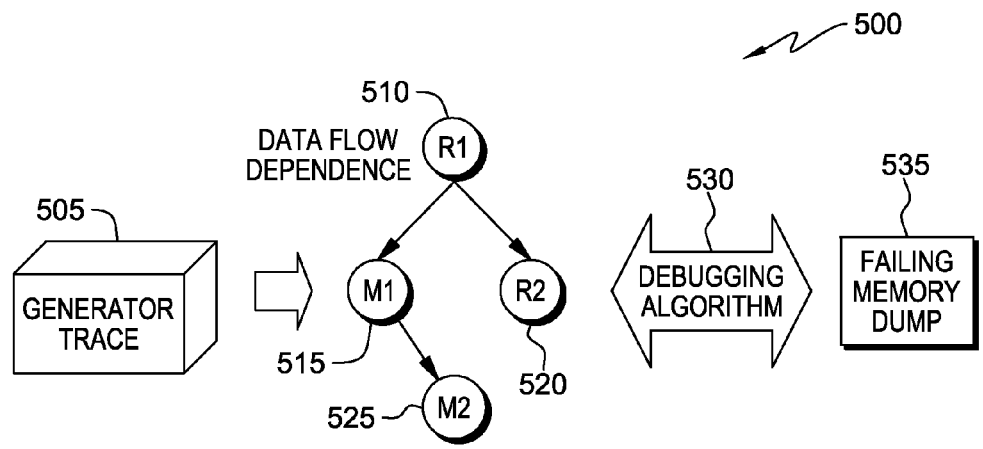
FIG. 5
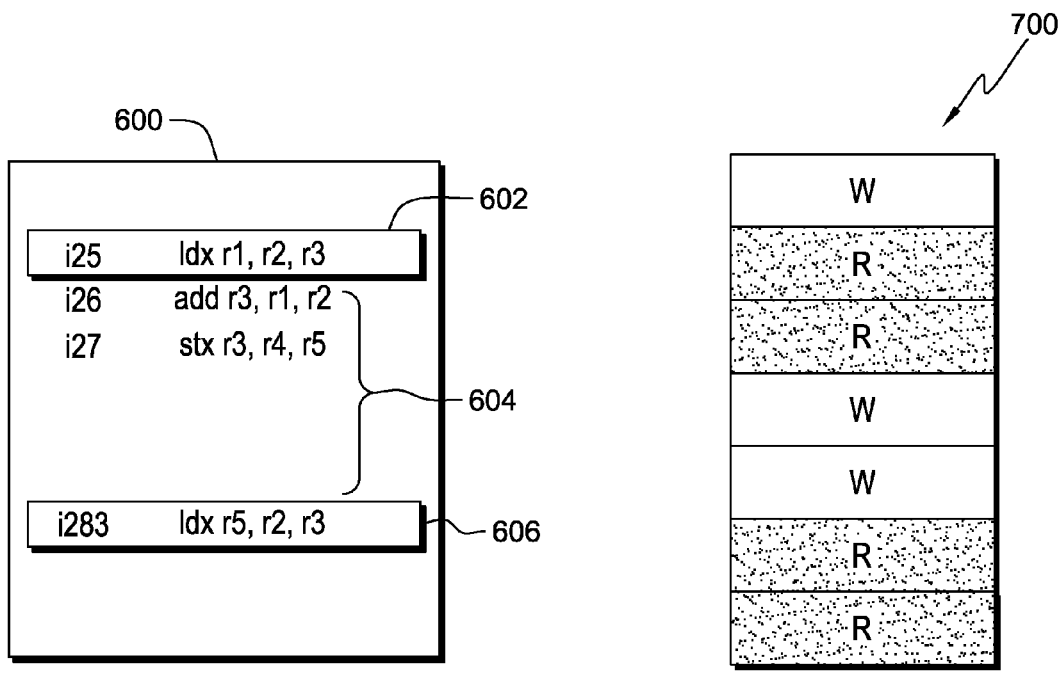
FIG. 6
FIG. 7

| i1 | ldx r2, r4, r5 |
| i2 | addi r6, r6, 25 |
| i3 | ld r3, 100(r6) |
| i4 | add r1, r2, r3 |
| i5 | stx r1, r4, r6 |

| i1 | ld r1, 25 (r2) |
| i2 | addi r2, r2, 64 |
| i3 | stx r2, r1, r3 |
| i4 | or r1, r2, r3 |
| i5 | add r6, r5, r2 |
| i6 | ldx r2, r4, r5 |
| i7 | st r4, 87 (r1) |
| i8 | ld r1, 49 (r6) |
| i9 | add r1, r1, r2 |
| i10 | st r1, 31 (r2) |
| i11 | ld r3, 100 (r6) |
| i12 | addi r6, r6, 25 |
| i13 | sub r6, r1, r2 |
| i14 | add r1, r2, r3 |
| i15 | stx r1, r4, r6 |

EFFICIENT DEBUGGING OF MEMORY MISCOMPARE FAILURES IN POST-SILICON VALIDATION

FIELD OF THE INVENTION

The present disclosure relates generally to the field of debugging post-silicon validation of logic hardware.

BACKGROUND OF THE INVENTION

Debugging failures "in post-silicon" is a challenging task. One of the recognized challenges, when compared to "pre-silicon" stage debugging is the lack of observability. The failures seen in post-silicon can be of various types ranging from failures with memory or register (collectively herein called reg/mem) miscompares, unexpected interrupts to more severe errors like machine checks. Debugging frequently involves finding a root cause of a failure so that appropriate fixes can be implemented.

Conventional tools, called exercisers, operate in the post-silicon stage to validate the silicon using at least one of the following approaches: (i) consistency; and/or (ii) reference-based. Debugging reg/mem miscompares in both these approaches tends to be a time-consuming task. The time required to debug miscompares can vary depending on various factors like testcase package size, memory foot print used by the testcase, recreatability issues, and other scenario-specific factors.

Debugging is sometimes performed with respect to a golden reference model. An sTPSM (stand alone TPSM-Exerciser) framework, which is a reference model based validation framework, may also be used. In the sTPSM framework, a package of testcases is generated offline and there is full memory observability, which means that any register value occasioned by the testcase will be stored to memory before writing a new value to that register location. The instruction trace generated in the framework can be used to generate the input reference model which is used by the sTPSM run time checker to validate against the observed results. Back annotating the failing instruction is therefore a potentially difficult task. In sTPSM, the CRC (cyclic redundancy check) of the expected memory is used. However, byte wise comparison between actual and expected memory is not possible. This increases the debugging complexity and makes determining the root cause of a failure even more difficult.

SUMMARY

According to an aspect of the present invention, a method includes the following steps (not necessarily in the following order): (i) receiving a first memory location that is subject to a miscompare, after running a set of machine readable instructions, between an associated simulated value for the first memory location and an associated actual value for the first memory location; (ii) backtracking through instructions of the set of machine readable instructions to determine the identity of a set of backtrack locations upon which the first memory location is dependent, with the set of backtrack locations being made up of at least one of: memory locations and register locations; and (iii) comparing respective associated simulated values and actual values for at least one of the backtrack locations to help determine a cause of the miscompare at the first memory location.

BRIEF DESCRIPTION OF THE SEVERAL VIEWS OF THE DRAWINGS

FIG. 5 is a schematic view of a second embodiment of a system according to the present invention;

FIG. 6 is a diagram of a first embodiment of a testcase for use in the present invention;

FIG. 7 is a read-write data structure generated and/or used by the present invention;

DETAILED DESCRIPTION

Figure 1:
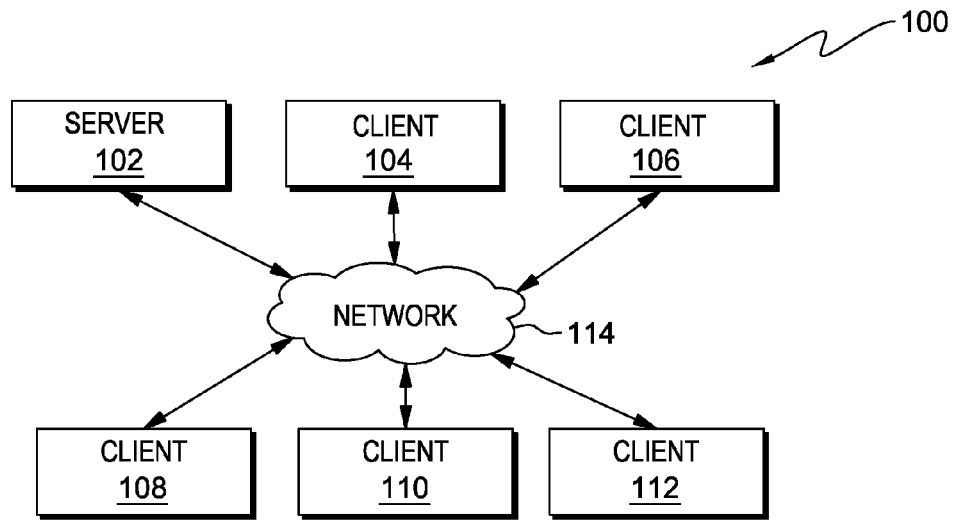
FIG. 1 is a schematic view of a first embodiment of a computer system (that is, a system including one or more processing devices) according to the present invention.

This Detailed Description section is divided into the following sub-sections: (i) The Hardware and Software Environment; (ii) First Embodiment; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
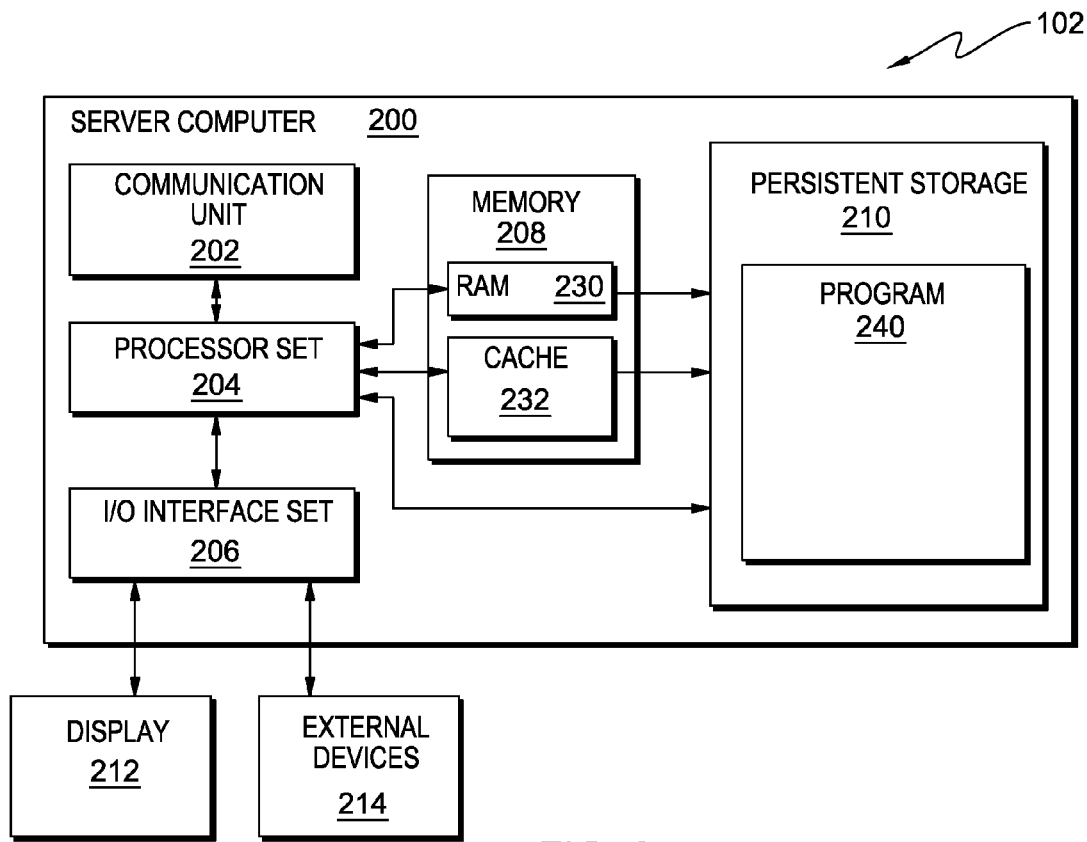
FIG. 2 is a schematic view of a computer sub-system (that is, a part of the computer system that itself includes a processing device) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the First Embodiment(s) sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system.

For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. FIRST EMBODIMENT

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
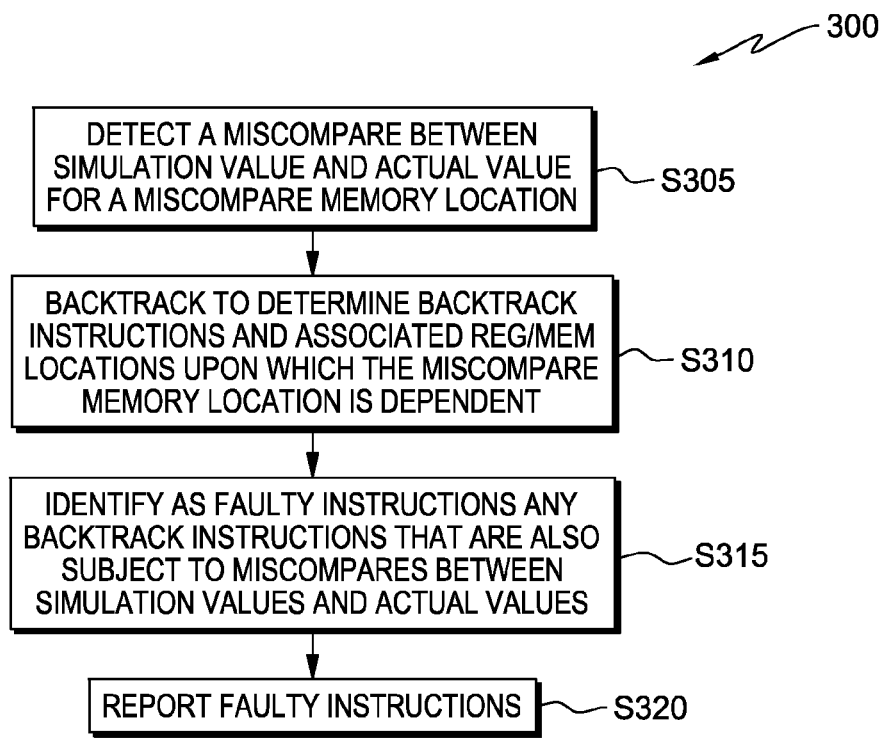
FIG. 3 is a flowchart showing a process performed, at least in part, by the first embodiment computer system.
Figure 4:
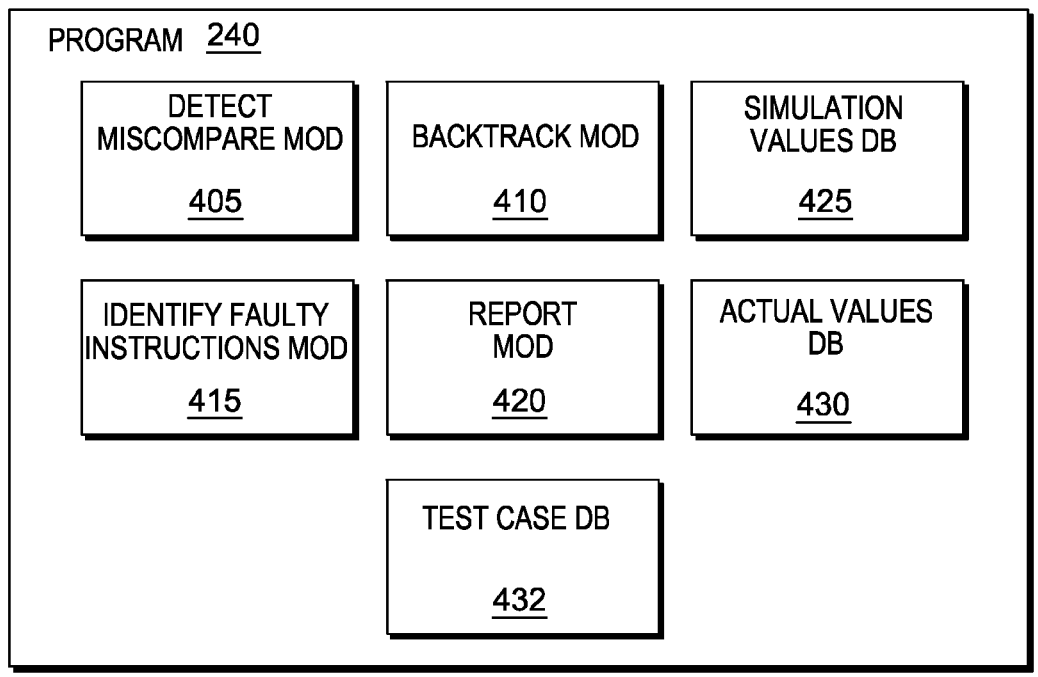
FIG. 4 is a schematic view of a software program portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

Processing begins at step S305, where detect miscompare module ("mod") 405 detects a miscompare between a simulation value and actual value for a miscompare memory location. The simulation values come from values that are encountered and stored as a piece of software (herein called a testcase) which is run on circuit simulator software. One type of circuit simulator software that will be discussed, below, in the Further Comments And/Or Embodiments sub-section is called a reference model, and the running of the testcase on the reference model is called "pre-silicon validation," or, more simply, "pre-silicon." However, it is pointed out that any kind of simulation software (now known or to be developed in the future) could be used, and that the simulation data need not be obtained later in time than the actual values.

In this embodiment, simulation values are received and stored in simulation values database 425 (see FIG. 4), and these values include all values that are in all emulated memory locations and all emulated register locations of the simulated software at all times during the running of the testcase. Alternatively, some simulation values data collection may be less comprehensive, but this leads to a risk that proper backtracking will not be able to be performed in later steps of method 300.

In this embodiment, actual values are received and stored in actual values database 430 (see FIG. 4). These actual values come from actually running the testcase on real (usually silicon based) circuitry hardware. The running of the testcase on the real hardware is called "post-silicon validation," or, more simply, "post-silicon." In this embodiment, actual values are received from a memory dump that occurs during the running of the testcase. In this embodiment, the memory dump occurs when an error is detected, but it may be possible to use memory dumps that occur even without detection of an error (but, in this case, it is not necessarily likely that there will be a miscompare because there would be no particular reason to believe that the testcase had encountered any sort of problem). The memory dump only includes the values of memory locations at the time execution is stopped, but the memory dump does not include the values for register locations.

Processing proceeds to step S310, where backtrack mod 410 backtracks to determine instructions and associated reg/mem locations that led to the miscompare value detected at step S305. This kind of backtracking is discussed in detail, below, in the Further Comments and/or Embodiments subsection. Roughly speaking, the instructions of the testcase show how the miscompare value is derived from, and dependent upon, other previous values of the same variable and/or other variables used in the testcase. These other previous values and/or other variables may be derived from, and dependent upon, still earlier values and/or other additional variables. In this embodiment, every variable upon which the miscompare is dependent (that is, the "relevant variables") is tracked all the way back to its respective ultimate source in the running of the testcase. This backtracking reveals every memory location and every register location that would have held a value of a relevant variable at any juncture (that is, operational "place" within the instructions of the testcase) of the running of the testcase. In this embodiment, this backtracking of step S310 is done based solely on the instructions of the testcase, which are stored in testcase database 432 (see FIG. 4).

When the backtracking of step S310 is performed by mod 410, the backtracking of a relevant variable will generally involve both memory locations and register locations. The observability point still remains in memory, but the values flow through registers. The software keeps track of memory-memory, memory-register and register-register dependencies where the source and destination of these instructions will be memory and registers accordingly.

Processing proceeds to step S315, where identify faulty instructions mod 415 identifies as faulty as memory locations (and associated operational junctures) that are subject to a miscompare as between the simulation value (of database 425) and the actual value (of actual values database 430). There are no register values included in the actual values of database 430, but database 430 does have actual values for all memory locations at all junctures of the running of the testcase on the real hardware (that is, post-silicon). The earliest junctures where miscompares of the relevant variables, as between the actual values (of database 430) and the simulated values (of database 425), are determined by mod 415. These earliest junctures are indicative of the instruction(s) in the testcase which introduced the error(s) that was the root cause(s) of all the miscompares. This is helpful for determining problems introduced into a circuit when it is produced as real hardware (that is, post-silicon), and it is determined automatically by the software in this method 300.

Processing proceeds to step S320, where report mod 420 reports the faulty instructions identified at step S315. This report may be made to a file (not shown), an email, a text message, a report to diagnostic software, a screen display, a hard copy, a cloud collaboration depository, etc.

III. FURTHER COMMENTS AND/OR EMBODIMENTS

FIG. 5 shows diagram 500 including generator trace block 505; first register location 510; first memory location 515; second register location 520; second memory location 525; debugging algorithm block 530; and failing memory dump block 535. Generator trace block 505 includes data from the reference model from which the following data dependence relationships (shown by arrows in FIG. 5) can be determined: (i) first register location 510 depends directly upon a value that was stored in second register location 520; (ii) first register location 510 depends directly upon a value that was stored in first memory location 515; (iii) first memory location 515 depends directly upon a value that was stored in second memory location 525; and (iv) first register location 510 depends indirectly upon a value that was stored in second memory location 525. Debugging algorithm block 520 is programmed to determine these relationships from the data of generator trace block 505 and to use these values, in conjunction with the post-silicon data of failing memory dump block 535 to find out the root cause of an error was eventually detected during the post-silicon run of a testcase.

In post-silicon validation, execution is not stopped at each and every instruction to check if it was executed correctly. When an error is detected at the time that a "last-executed instruction" was executed, it is quite possible, or even likely, that the detected error was already in existence prior to the execution of the last-executed instruction. In other words, the error might have been introduced at the time of execution of some earlier instruction, and, then, this error may have been carried over through some reg/mem location(s) (that is, register location(s) and/or memory location(s)). If this error came into existence at some instruction executed prior to the last-executed instruction (that is, the "earliest-erroneous instruction"), then this error would be observable only at certain reg/mem(s) location at the time of the earliest-erroneous instruction. This error would potentially infect with error all subsequent dependent instructions (herein sometimes referred to as "later-erroneous instructions").

As shown in FIG. 6, diagram 600 shows an example of some data flow dependencies between the instruction operands (register and memory). At earliest-erroneous instruction (also called instruction i25) 602 an error is introduced, which error causes an incorrect value at register location r1. At later-erroneous instructions 604 (also called instructions i26 to i282) the error is propagated from r1 to r3 and r3 to a memory location. At last-executed instruction 606 (i283), the error is detected during the post-silicon running of the testcase.

The diagram of FIG. 6 emphasizes the fact that when an error is detected at some instruction, it need not be the first place the error occurred. The actual error might have occurred at an earlier stage in the instruction stream and got carried over through some register or memory (data flow). Here, the ldx instruction did not load the right value into r1, and the value in r1 was propagated to r3 (i26). The following instruction (i27) wrote the incorrect value of r3 into memory. This is where it got detected. This error was detected only in i283 when a wrong value was loaded from the memory. In the diagram of FIG. 6: (i) ldx is the POWER mnemonic which stands for "Load Doubleword Indexed" instruction in the PowerPC ISA; (ii) stx is the POWER mnemonic which stands for "Store Word Indexed" instruction in the PowerPC ISA. In the example shown in FIG. 6, the visibility or observability of the testcase is defined by writing the values of the registers to memory i.e. making them observable. In the given stream the values wherever R1 is made observable matches with the expected value until the point where it is made observable in i25. It is assumed in the example that i25 is the first load/store instruction in the instruction stream where the error in R1 was propagated to the memory. In this example, the error may have been introduced by both R1 and R2 or only R1 or only R2. In that case we need to track back using the data flow dependency built up and find out the point where the values differ for the first time for the registers where the mismatch in value occurs. The point to be made here is we need to back track for all erroneous data sources until there is a match with the expected value. The dependency graph determines all the dependencies in the offline case. But this embodiment performs backtracking for only those data resources whose values mismatch. Having said that, it is possible for us to online debugging with the dependence graph being built incrementally in slices depending on the data sources of interest.

Returning attention to FIG. 5, algorithm 530 builds a dependency graph (represented by items 510, 515, 520 and 525 and the arrows connecting them) based on the reference model. The generator trace block 505 is a portion of the reference model that has the values of registers and memory locations for every different state that they take on during the pre-silicon running of the testcase pre-silicon on the reference model software. Given a faulty memory address, the dependency graph enables backtracking to find the identity of the earliest-erroneous instruction. The series of instructions executed by the testcase, as recorded in the trace files, are broken into a number of tuples which represent read/write operations on the reg/mem locations when the testcase is run on the reference model in the pre-silicon stage. Each reg/mem location will have a number of write operations on which various read operations are dependent. Debugging algorithm 530 builds a write queue with all the read operations that are dependent on a particular write operation, as shown in diagram 700 of FIG. 7. More specifically, diagram 700 shows a dependency chain for one specific reg/mem location.

Figure 8:
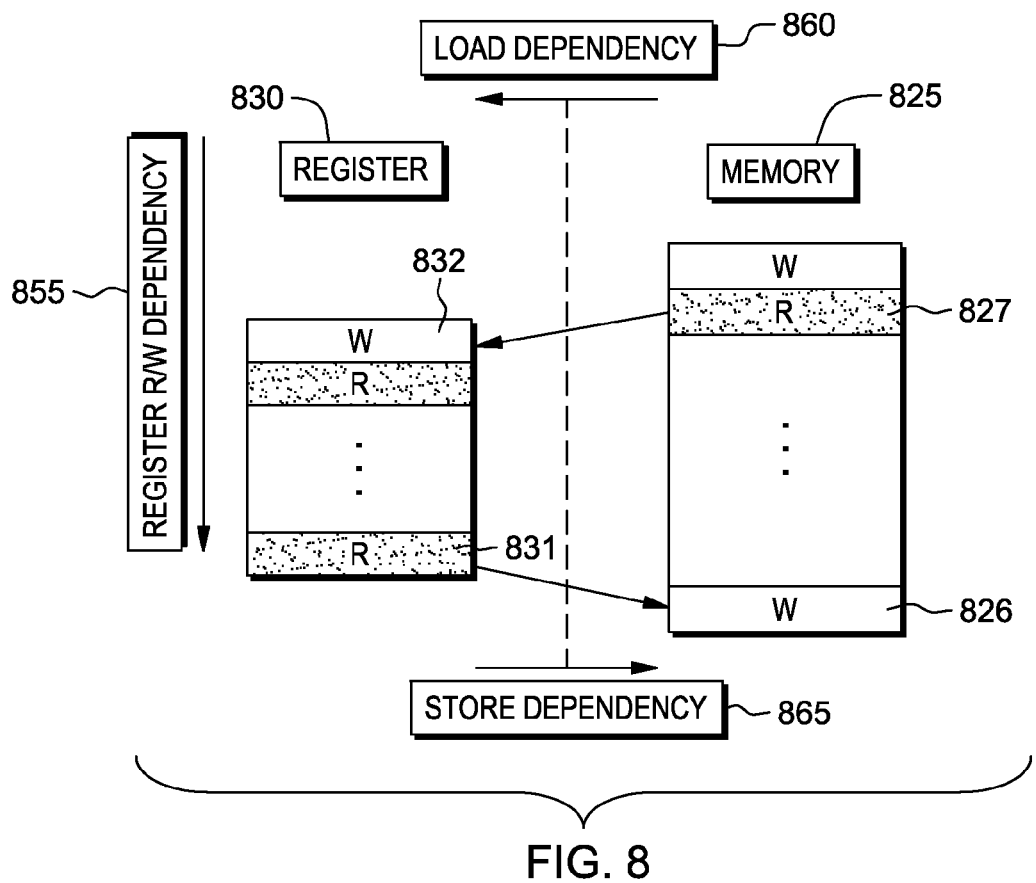
FIG. 8 is a diagram helpful in understanding types of dependencies determined by the present invention.

As shown in the diagram of FIG. 8, debugging algorithm 530 (See FIG. 5) establishes dependency between memory locations and register locations. Diagram 800 of FIG. 8 includes: memory dependency tuple stack 825; register dependency tuple stack 830; read/write dependency direction 855; load dependency direction 860; and store dependency direction 865. A value written into memory at instruction 826 is dependent upon a value read from a register at instruction 831. As further shown in diagram 800, a value read from a memory at instruction 827 is written into a memory at instruction 832.

Figure 9:
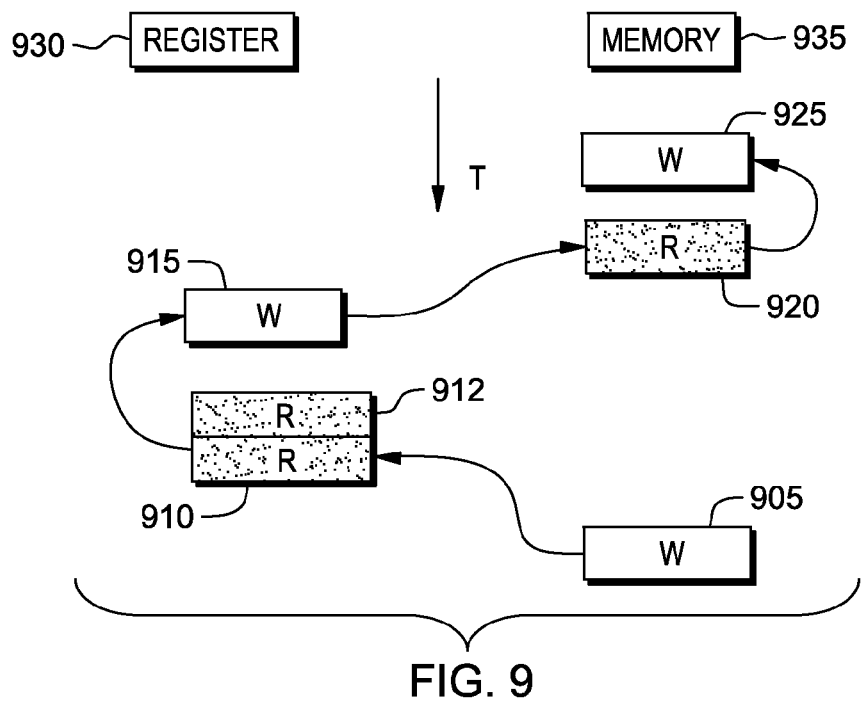
FIG. 9 is another diagram helpful in understanding types of dependencies determined by the present invention.
Figures 10, 11:
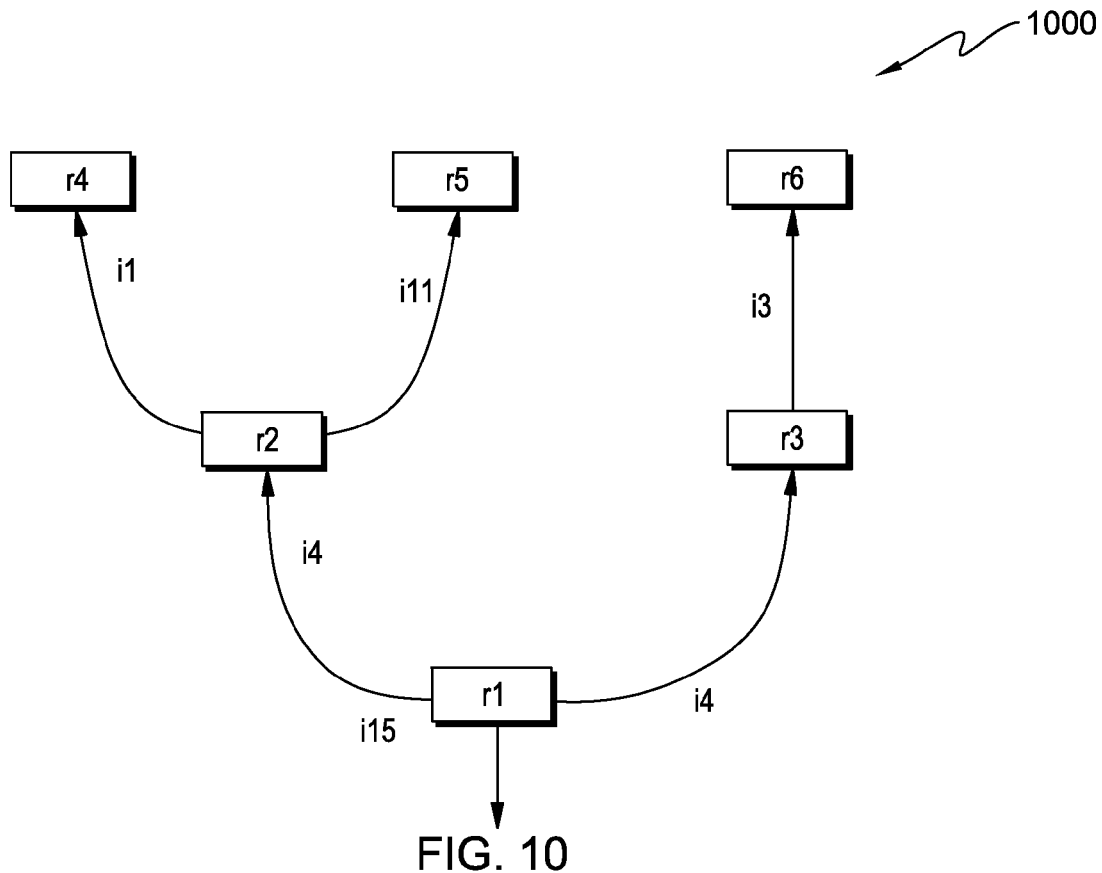
FIG. 10 is another diagram helpful in understanding types of dependencies determined by the present invention.
FIG. 11 is a diagram of a second embodiment of a testcase for use in the present invention.
Figures 12, 13:
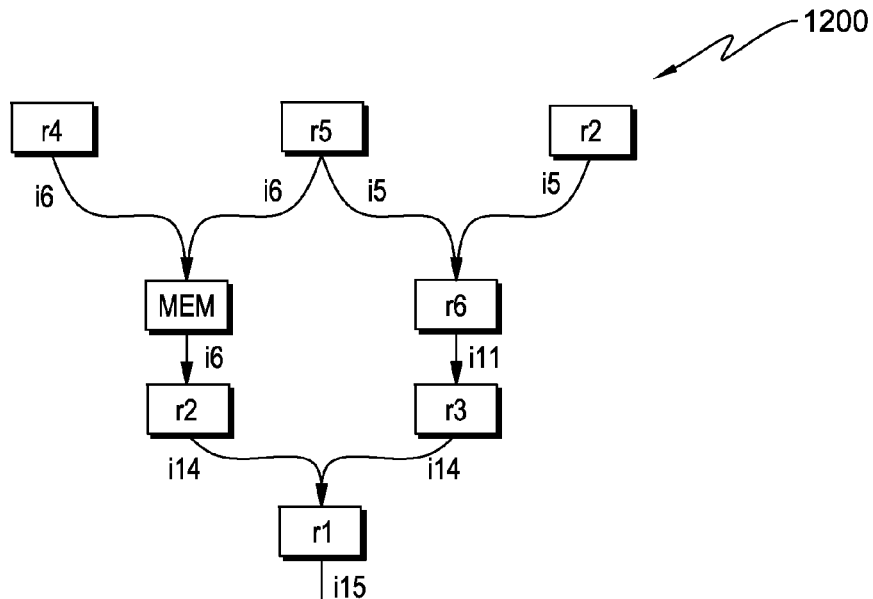
FIG. 12 is another diagram helpful in understanding types of dependencies determined by the present invention.
FIG. 13 is a diagram of a third embodiment of a testcase for use in the present invention.

As shown in FIG. 9, a diagram illustrates a backtracking algorithm according to the present invention. This diagram includes: first memory write instruction 905; register read instructions 910, 912; register write instruction 915; memory read instruction 920; earliest-erroneous instruction (also called second memory write instruction) 925; register column heading 930; memory column heading 935; and time direction T. In the pre-silicon stage, and then, again later in the post-silicon stage, the instructions are executed in the following time order from earliest to latest: 925, 920, 915, 912, 910 and 905. In this embodiment, there are other instructions (not shown in the diagram of FIG. 9) which are also executed, but these do not involve erroneous values and are therefore not relevant. Register read instruction 912 is part of the dependency chain, but because 905 is dependent upon instruction 910 only there was no backtracking from instruction 912.

In the diagram of FIG. 9, the address of the failed page (or memory block) is obtained and the block of memory which contains the miscompare(s) is extracted. The analysis begins by identifying the instructions that accessed the relevant memory block. Next, these instructions are broken down into read/write operations to form tuples. Using the information from the tuples, the dependency graphs for each register and memory location are formed, having links for register-register, memory-memory and register-memory dependencies as shown in diagram 900.

The erroneous instruction is tracked back to using the information from the dependency graph, by comparing the actual values with the values generated by the pre-silicon stage running of the testcase in the reference model. This is because: (i) the memory dump of the post-silicon stage running of the testcase will save data for memory locations; but (ii) the reference model of the pre-silicon stage can save all values at all times for each and every memory location and each and every register location. In other words, the post-silicon scope is limited to memory location history, but the pre-silicon scope covers and subsumes both memory location history and register location history. This more complete history from the pre-silicon stage allows complete backtracking through both memory location operations and register location operations. In this way, dependency data collected by running the pre-silicon stage reference model is leveraged at least in the determination of register read instruction 910 (upon which instruction 905 is directly dependent) and the determination of register write operation 915 (upon which register read operation 910 is dependent). The reference model related data is also leveraged to determine the identity of memory read instruction 920. This, in turn, facilitates full data flow dependence analysis, all the way back to earliest-erroneous instruction 925.

As shown in FIGS. 10 to 13 (diagrams 1000, 1100, 1200 and 1300, respectively), debugging failures using backtracking is typically a fairly complex task and it is extremely difficult with longer instruction streams (700-1000 instructions) and implicit dependencies between instruction operands. There are instructions which modify the CR or additional status registers implicitly. CR stands for Condition Register, a Special purpose Register, which is a 32-bit register that reflects the result of certain operations and provides a mechanism for testing and branching. Tracking those dependencies manually is an extremely difficult and time consuming task. There are multiple operand dependencies that branch out from instructions and creating dependency trees as we move up in the instruction trace. More specifically: (i) diagram 1000 shows an example of dependency data graph complexity with respect only to data flow through the registers; (ii) diagram 1100 shows the example instructions that lead to the dependency data graph of diagram 1000; (iii) diagram 1200 shows an example of dependency data graph complexity with both registers and a memory location; and (iv) diagram 1300 shows the example instructions that lead to the dependency data graph of diagram 1200.

The back tracking algorithm starts with a miscompare address. It then uses the dependence graph to back track in the instruction stream. The back tracking stops when a memory match between the pre-silicon and post silicon values are obtained in the backtracked data dependency trail. The instruction at which the values matched is marked (Insn_Correct instruction). Then, traversing forward from the Insn_Correct instruction to the earliest instruction which has a memory mismatch between its pre- and post-silicon values is marked (Insn_Mismatch). All instructions within the two marked instructions in the stream and which form a part of the dependence flow graph are considered faulty.

Some embodiments of the present disclosure provide an efficient way to: (i) debug reg/mem miscompares and/or; (ii) identify the erroneous instruction(s) which caused a failure.

Some embodiments of the present disclosure have one, or more, of the following features, characteristics and/or advantages: (i) application of a novel algorithm to the reference-based debugging approach; (ii) reducing the time taken to debug to a few seconds; (iii) does not require storage of the whole of the expected memory as part of the reference model (space compaction); (iv) use of a signature (calculated for sub-blocks of memory to aid debugging) of the used memory is stored as part of the reference model; (v) an algorithm and a framework combination which leverages the information from the generation phase to automatically detect faulty instruction executions; (vi) a data dependence approach to track a data flow between the various reg/mem locations affected by the running of a testcase; (vii) preservation of a data flow, along with data values, among the various reg/mem locations across the various instructions by using a set of read-write queues; (viii) maintenance of the set of read-write queues for all register operands and all memory locations affected by execution of the testcase instructions; (ix) construction of a data dependence graph (sometimes also called a data dependence structure) based, at least in part, upon a trace generated when the testcase is run, usually at the pre-silicon stage, on software (herein called a "reference model") that emulates, or simulates, the logic of the planned semiconductor device as it runs a testcase; (x) use of a run time checker to determine an address of a failing sub-block in order to effect a memory dump of the failing sub-block; and/or (xi) comparison of the failing sub-block memory dump against the dependence structure built from the reference model.

In some embodiments, a back tracking algorithm is used to traverse the data dependence graph in a reverse manner to zero-in on the first instant where the memory-dump value does not match with the expected value in the dependence structure. This technique is believed to reduce the time taken to isolate the failing instruction down to a few seconds. Some embodiments can be used for debugging memory miscompares in, for example, power series server chips.

Some embodiments of the present disclosure may include one, or more, of the following features, characteristics and/or advantages: (i) debug functional failures detected at the post silicon stage; (ii) debugging and/or root causing functional failures from an instruction and related data dependency perspective; (iii) debugging at the architectural level, as contrasted with the physical layout level; (iv) use of memory checkpointing that is done as part of the testcase generation process; and/or (v) handling and/or detection of multiple errors.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer implemented method comprising:
receiving testcase data including:
a testcase in the form of a plurality of machine readable instructions executable by a reference model software version of a processor and by a hardware-implemented version of the processor, and
generator trace data including a plurality of trace values respectively corresponding to a plurality of memory locations of the reference model software version of the processor for every different state that the plurality of memory locations take on when running the testcase on the reference model software version of the processor;
receiving miscompare data including: (i) data identifying a first memory location of the processor, where the first memory location has been subject to a miscompare, between results obtained by running at least a portion of the testcase on the reference model software version of the processor and results obtained by running the at least a portion of the testcase on the hardware-implemented version of the processor, and (ii) actual values for memory locations received from a failing memory dump made upon detection of an error during the running of the at least a portion of the testcase on the hardware-implemented version of the processor;
backtracking through instructions of the plurality of machine readable instructions of the testcase to determine an identity of a set of backtrack locations, upon which the first memory location is dependent, with the set of backtrack locations being made up memory locations of the plurality of memory locations of the processor; and
comparing, for the memory locations in the set of backtrack locations, the corresponding generator trace data and the corresponding actual values, to help determine a cause of the miscompare at the first memory location.

2. The computer implemented method of claim 1 wherein:
the set of backtrack locations includes a memory location sub-set including all memory location(s) in the backtrack set; and
the comparison of the corresponding generator trace data and the corresponding actual values includes a comparison of all of the memory location sub-set memory location(s) of the set of backtrack locations.

3. The computer implemented method of claim 1 further comprising:
determining an earliest miscompare backtrack location based on the comparison of the corresponding generator trace data and the corresponding actual values; and
identifying a first faulty instruction in the machine readable instruction set that caused the earliest miscompare backtrack location to take on its respective values obtained from the corresponding generator trace data and from the corresponding actual values.

4. The computer implemented method of claim 1 wherein the backtracking includes:
generating a set of read-write queues based on the plurality of machine readable instructions; and
determining backtrack locations based upon the read-write queues.

5. A computer program product comprising software stored on a non-transitory software storage device, the software comprising:
- first program instructions programmed to receive testcase data including: (i) a testcase in the form of a plurality of machine readable instructions executable by a reference model software version of a processor and by a hardware-implemented version of the processor, and (ii) generator trace data including a plurality of trace values respectively corresponding to a plurality of memory locations of the reference model software version of the processor for every different state that the plurality of memory locations take on when running the testcase on the reference model software version of the processor;
- second program instructions programmed to receive miscompare data including: (i) data identifying a first memory location of the processor, where the first memory location has been subject to a miscompare, between results obtained by running at least a portion of the testcase on the reference model software version of the processor and results obtained by running the at least a portion of the testcase on the hardware-implemented version of the processor, and (ii) actual values for memory locations received from a failing memory dump made upon detection of an error during the running of the at least a portion of the testcase on the hardware-implemented version of the processor;
- third program instructions programmed to backtrack through instructions of the plurality of machine readable instructions of the testcase to determine an identity of a set of backtrack locations, upon which the first memory location is dependent, with the set of backtrack locations being made up memory locations of the plurality of memory locations of the processor; and
- fourth program instructions programmed to compare, for the memory locations in the set of backtrack locations, the corresponding generator trace data and the corresponding actual values, to help determine a cause of the miscompare at the first memory location.

6. The computer program product of claim 5 wherein:
- the set of backtrack locations includes a memory location sub-set including all memory location(s) in the backtrack set; and
- the fourth program instructions are further programmed to compare all of the memory location sub-set memory location(s) of the set of backtrack locations.

7. The computer program product of claim 5 wherein the software further comprises:
- fifth program instructions programmed to determine an earliest miscompare backtrack location based on the comparison of the corresponding generator trace data and the corresponding actual values; and
- sixth program instructions programmed to identify a first faulty instruction in the machine readable instruction set that caused the earliest miscompare backtrack location to take on its respective values obtained from the corresponding generator trace data and from the corresponding actual values.

8. The computer program product of claim 5 wherein the third program instructions are further programmed to:
- generate a set of read-write queues based on the plurality of machine readable instructions; and
- determine backtrack locations based upon the read-write queues.

9. A computer system comprising:
- a processor(s) set; and
- a software storage device;
- wherein:
- the processor(s) set is operatively connected to the software storage device so that the processor(s) set can run software stored on the software storage device;
- the software comprises:
  - first program instructions programmed to receive testcase data including: (i) a testcase in the form of a plurality of machine readable instructions executable by a reference model software version of a processor and by a hardware-implemented version of the processor, and (ii) generator trace data including a plurality of trace values respectively corresponding to a plurality of memory locations of the reference model software version of the processor for every different state that the plurality of memory locations take on when running the testcase on the reference model software version of the processor,
  - second program instructions programmed to receive miscompare data including: (i) data identifying a first memory location of the processor, where the first memory location has been subject to a miscompare, between results obtained by running at least a portion of the testcase on the reference model software version of the processor and results obtained by running the at least a portion of the testcase on the hardware-implemented version of the processor, and (ii) actual values for memory locations received from a failing memory dump made upon detection of an error during the running of the at least a portion of the testcase on the hardware-implemented version of the processor,
  - third program instructions programmed to backtrack through instructions of the plurality of machine readable instructions of the testcase to determine an identity of a set of backtrack locations, upon which the first memory location is dependent, with the set of backtrack locations being made up memory locations of the plurality of memory locations of the processor, and
  - fourth program instructions programmed to compare, for the memory locations in the set of backtrack locations, the corresponding generator trace data and the corresponding actual values, to help determine a cause of the miscompare at the first memory location.

10. The computer system of claim 9 wherein:
- the set of backtrack locations includes a memory location sub-set including all memory location(s) in the backtrack set; and
- the fourth program instructions are further programmed to compare all of the memory location sub-set memory location(s) of the set of backtrack locations.

11. The computer system of claim 9 wherein the software further comprises:
- fifth program instructions programmed to determine an earliest miscompare backtrack location based on the comparison of the corresponding generator trace data and the corresponding actual values; and
- sixth program instructions programmed to identify a first faulty instruction in the machine readable instruction set that caused the earliest miscompare backtrack location to take on its respective values obtained from the corresponding generator trace data and from the corresponding actual values.

12. The computer system of claim 9 wherein the third program instructions are further programmed to:
   generate a set of read-write queues based on the plurality of machine readable instructions; and
   determine backtrack locations based upon the read-write queues.

* * * * *